United States Patent
Sharma et al.

(10) Patent No.: US 10,834,602 B2
(45) Date of Patent: Nov. 10, 2020

(54) AVOIDING INTERFERENCE BETWEEN HOTSPOT SERVICE AND LTE UNLICENSED CELLULAR OPERATION

(71) Applicant: APPLE INC., Cupertino, CA (US)

(72) Inventors: Prateek Sharma, San Jose, CA (US); Tianyan Pu, Cupertino, CA (US); Sreevalsan Vallath, Dublin, CA (US); Deepankar Bhattacharjee, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/174,973

(22) Filed: Oct. 30, 2018

(65) Prior Publication Data

US 2019/0200236 A1 Jun. 27, 2019

Related U.S. Application Data

(60) Provisional application No. 62/579,995, filed on Nov. 1, 2017.

(51) Int. Cl.

| | | |
|---|---|---|
| *H04W 16/14* | (2009.01) | |
| *H04W 84/10* | (2009.01) | |
| *H04W 36/06* | (2009.01) | |
| *H04W 72/04* | (2009.01) | |
| *H04L 5/00* | (2006.01) | |
| *H04W 88/02* | (2009.01) | |
| *H04W 88/08* | (2009.01) | |
| *H04W 76/10* | (2018.01) | |

(Continued)

(52) U.S. Cl.
CPC ............. *H04W 16/14* (2013.01); *H04L 5/001* (2013.01); *H04L 5/0098* (2013.01); *H04W 36/06* (2013.01); *H04W 72/0453* (2013.01); *H04W 72/082* (2013.01); *H04W 76/10* (2018.02); *H04W 84/10* (2013.01); *H04W 88/02* (2013.01); *H04W 88/08* (2013.01); *H04W 24/02* (2013.01); *H04W 84/12* (2013.01)

(58) Field of Classification Search
CPC ...... H04L 5/001; H04L 5/0098; H04W 16/14; H04W 24/02; H04W 36/06; H04W 72/0453; H04W 72/082; H04W 76/10; H04W 84/12; H04W 88/02; H04W 88/08
See application file for complete search history.

(56) References Cited

U.S. PATENT DOCUMENTS

| | | | |
|---|---|---|---|
| 2015/0003321 A1* | 1/2015 | Burchill ............. | H04L 47/6275 370/328 |
| 2015/0223243 A1* | 8/2015 | Tabet .................. | H04W 28/085 370/330 |

(Continued)

*Primary Examiner* — Mansour Oveissi
(74) *Attorney, Agent, or Firm* — Fay Kaplun & Marcin, LLP

(57) ABSTRACT

A user equipment (UE) has a cellular connection established by a cellular chip, the cellular connection including a secondary component carrier (SCC) of carrier aggregation (CA) in the unlicensed spectrum. The UE receives, by a WiFi chip of the UE, a message from the cellular chip indicating a first frequency band corresponding to the SCC, determines whether a hotspot service is enabled utilizing at least a portion of the first frequency band that the cellular chip has indicated corresponds to the SCC and when the hotspot service is enabled, switches, by the WiFi chip, the hotspot service from the first frequency band to a second frequency band.

20 Claims, 4 Drawing Sheets

(51) Int. Cl.
*H04W 72/08* (2009.01)
*H04W 24/02* (2009.01)
*H04W 84/12* (2009.01)

(56) References Cited

U.S. PATENT DOCUMENTS

2015/0351096 A1* 12/2015 Sidhu ................ H04W 72/0453
370/329
2016/0212774 A1* 7/2016 Tran Le ............ H04W 52/0206
2018/0092109 A1* 3/2018 Belghoul ............ H04W 72/085

* cited by examiner

AVOIDING INTERFERENCE BETWEEN HOTSPOT SERVICE AND LTE UNLICENSED CELLULAR OPERATION

PRIORITY INFORMATION/INCORPORATION BY REFERENCE

This application claims priority to U.S. Provisional Application 62/579,995 entitled "Avoiding Interference Between Hotspot Service and LTE Unlicensed Cellular Operation," filed on Nov. 1, 2017, the entirety of which is incorporated herein by reference.

BACKGROUND INFORMATION

A user equipment (UE) may be configured to establish a connection to at least one of a plurality of different networks or types of networks to perform a variety of different functionalities via the network connection. When connected to a Long Term Evolution (LTE) network, the UE and the network may utilize a carrier aggregation (CA) combination to exchange data. Certain types of CA utilize the unlicensed spectrum to provide a portion of the total bandwidth.

Simultaneously, the UE may provide a hotspot service where a further device may access the Internet by utilizing the WiFi chip of the UE as an access point to the Internet. However, certain types of connections between the UE and the further device may rely on a frequency band that may also be utilized by CA combinations that operate in the unlicensed spectrum. The hotspot service and CA may also utilize the same RF components of the UE. When she hotspot service and CA in the unlicensed spectrum attempt to utilize the same frequency bands or the same RF components, the UE may experience interference, which leads to degradation in service. The exemplary embodiments described herein enable a UE to avoid interference during the operation of a hotspot service and CA in the unlicensed spectrum.

SUMMARY

In one exemplary embodiment, a method is performed by a user equipment (UE) having a cellular connection established by a cellular chip, the cellular connection including a secondary component carrier (SCC) of carrier aggregation (CA) in the unlicensed spectrum. The method includes receiving, by a WiFi chip of the UE, a message from the cellular chip indicating a first frequency band corresponding to the SCC, determining whether a hotspot service is enabled utilizing at least a portion of the first frequency band that the cellular chip has indicated corresponds to the SCC and when the hotspot service is enabled, switching, by the WiFi chip, the hotspot service from the first frequency band to a second frequency band.

In another exemplary embodiment, a user equipment (UE) having a cellular chip and a WiFi chip is described. The cellular chip is configured to establish a cellular connection including a secondary component carrier (SCC) of carrier aggregation (CA) in the unlicensed spectrum, the cellular chip further configured to transmit a message indicating a first frequency band corresponding to the SCC. The WiFi chip is configured to receive the message and further configured to provide a hotspot service, wherein, when the hotspot service is enabled utilizing at least a portion of the first frequency band that the cellular chip has indicated corresponds to the SCC, the WiFi chip switches the hotspot service from the first frequency band to a second frequency band.

In a still further exemplary embodiment, a method is described. The method includes determining that a hotspot service is to be initiated, determining whether a cellular connection is utilizing a first frequency band as at least one secondary component carrier (SCC) in an unlicensed spectrum and enabling, when the cellular connection is utilizing the SCC in the unlicensed spectrum, the hotspot service on a second frequency band that is different from the first frequency band.

DETAILED DESCRIPTION

Figure 1:
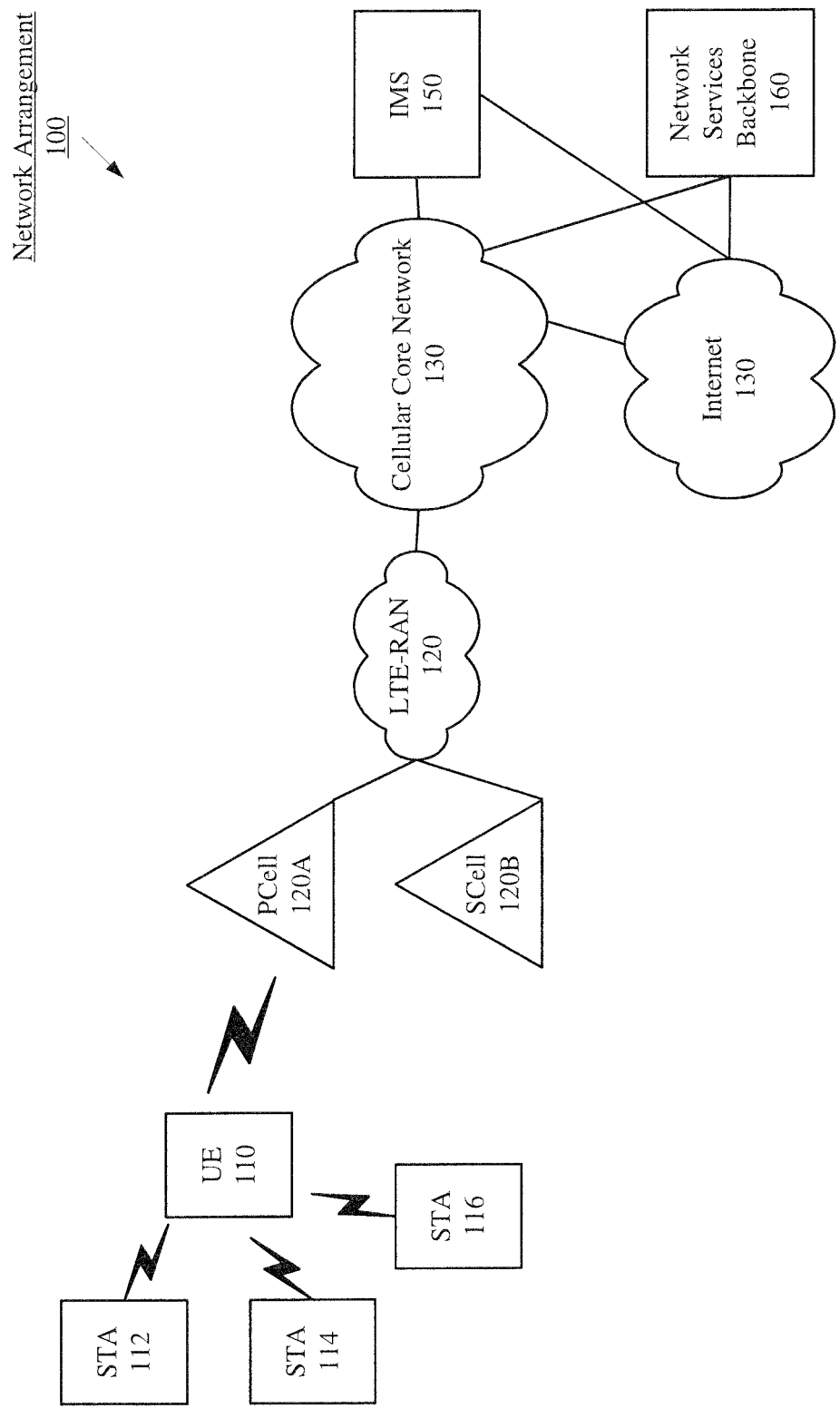
FIG. 1 shows a network arrangement according to various exemplary embodiments described herein.

The exemplary embodiments may be further understood with reference to the following description and the related appended drawings, wherein like elements are provided with the same reference numerals. The exemplary embodiments are related to a device, system, and method for a user equipment (UE) to avoid interference when operating a hotspot service and utilizing carrier aggregation (CA) in the unlicensed spectrum (e.g. License Assisted Access (LAA)) to exchange data with a network. The hotspot service and LAA may utilize the same radio frequency (RF) components and the same frequency (or frequency bands) for communication. This may cause the UE to experience interference and consequently, LAA and WiFi functionality may experience degradation in performance. The exemplary embodiments provide a first mechanism for a UE to avoid interference between the hotspot service and the LAA functionality by enabling the WiFi chip to switch frequency bands based on communication between the cellular chip and the WiFi chip. The exemplary embodiments also provide a second mechanism for the UE to avoid interference between hotspot operation and the LAA functionality by enabling the application processor to detect conflicts between hotspot service and LAA functionality. Based on the detected conflict, the application processor may request that the WiFi chip avoid utilizing a frequency that is also utilized by LAA.

The UE may operate a hotspot service by enabling one or more further devices to utilize the WiFi chip of the UE as an access point. The further devices may establish a connection with the WiFi chip of the UE via a 5 GHz or 2.4 GHz band. The UE may connect to a cellular network and relay the information from the further device to the cellular network. In one example, the cellular network may be a Long Term Evolution (LTE) network with LAA functionality that may utilize the unlicensed spectrum (e.g. 5 GHz) to exchange data with the UE. A person of ordinary skill in the art would understand that LAA is a subset of CA. It should be noted that reference to LAA is merely exemplary and the exemplary embodiments may apply to any type of CA that utilizes the unlicensed spectrum. Further, throughout this description, the terms "WiFi" and "WiFi chip" are used to refer to communicating via an unlicensed spectrum. It should be understood that these terms may refer to communications using any type of protocol, including, for example, IEEE 802.11x, IEEE 802.16x, wireless local area network (WLAN) protocols, etc.

With CA, the UE may associate with a network component that serves as a primary serving cell (PCell) and one or more further network components that serve as secondary serving cells (SCell). The PCell may control how data is exchanged between the UE and the network corresponding to the PCell. When the UE is CA capable, CA functionality enables the PCell and further SCells to combine bandwidths to exchange data with the UE. Thus, the PCell may provide a first portion of a total bandwidth while the SCells may provide a second portion of the total bandwidth. With LAA, the PCell provides a first portion of the total bandwidth in the licensed spectrum and at least one SCell provides a further portion of the total available bandwidth in the unlicensed spectrum (e.g. 5 GHz).

The exemplary embodiments relate to a scenario where a LAA SCell may utilize a 5 GHz band in the unlicensed spectrum to exchange data with the UE and the hotspot service may utilize a 5 GHZ band to connect the UE and the further devices. As mentioned above, this may cause the UE to experience interference and thus, degradation in performance of both LAA functionality and hotspot operation may occur. Accordingly, the exemplary embodiments enable a UE to avoid this interference. In this description, reference to frequencies or frequency bands may be used interchangeably and may refer to a range of frequencies which may be utilized to exchange information. Thus, reference to 2.4 GHz or 5 GHz may indicate a range of frequencies. It should also be noted that reference to specific frequencies or frequency bands (e.g. 2.4 GHz and 5 GHz) or specific networks (e.g. LTE) is merely for illustrative purposes. The exemplary embodiments may apply to any scenario where the cellular chip and the WiFi chip of the UE utilize the same frequency band or the same RF components.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to connect to and communicate with one or more networks. The exemplary embodiments will be described with regard to the network being an LTE radio access network (LTE-RAN 120) that has LAA functionality. However, the use of an LTE-RAN 120 is merely exemplary and the exemplary embodiments may apply to any network that may utilize CA in the unlicensed spectrum (e.g. 5G New Radio (NR)) to communicate with the UE 110 or any network that may communicate with the UE 110 in the unlicensed spectrum. Therefore, the UE 110 may have an LTE chipset to communicate with the LTE-RAN 120.

The LTE-RAN 120 is a portion of cellular network that may be deployed by cellular providers (e.g., Verizon, AT&T, Sprint, T-Mobile, etc.). LTE-RAN 120 may include, for example, base stations (Node Bs, eNodeBs, HeNBs, eNBS, gNBs, small cells, femtocells, picocells, microcells, etc.) that are configured to send and receive traffic from UEs that are equipped with the appropriate cellular chip set.

The UE 110 may connect to the LTE-RAN 120 via PCell 120A. Those skilled in the art will understand that any association procedure may be performed for the UE 110 to connect to the LTE-RAN 120 via the PCell 120A. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific access point (e.g. PCell 120A). As mentioned above, the use of the LTE-RAN 120 is for illustrative purposes and any type of network that utilizes the unlicensed spectrum to exchange data with the UE 110 may be used.

The PCell 120A may control the mechanism used in exchanging data, particularly how data is transmitted to and received by the UE 110. When the UE 110 is CA capable, CA functionality enables the PCell 120A to combine bandwidths with at least one further base station to exchange data with the UE 110. The PCell 120A may be any type of LTE base station that communicates with the UE 110 in the licensed spectrum. Thus, when operating in CA, the PCell 120A may provide a first portion of a total bandwidth for data to be exchanged while the at least one further base station may provide a second portion of the total bandwidth.

The exemplary network arrangement 100 utilizes LAA. Those skilled in the art would understand that License Assisted Access (LAA) is a type of CA where the at least one further base station (e.g. SCell 120B) operates in the unlicensed spectrum. For example, the PCell 120A may provide a first component carrier of a first bandwidth representing a primary component carrier (PCC) operating on a first frequency band in the licensed spectrum while the SCell 120B may provide a second component carrier of second bandwidth representing the secondary component carrier (SCC) operating on a second frequency band in the unlicensed spectrum. Accordingly, the PCell 120A provides a first bandwidth in the licensed band and the SCell 120B provides a second bandwidth in the unlicensed band to provide the total bandwidth for the UE 110. It is important to note that reference to a single SCell 120B is merely exemplary and LAA functionality refers to a scenario where at least one SCell operates in the unlicensed spectrum. Thus, the network arrangement 100 has a minimum of a single SCell operating in the unlicensed spectrum (e.g. SCell 120B) and may include a plurality of further SCells (not pictured) operating in either the licensed or unlicensed spectrum. Additionally, the LAA functionality may be performed in both the uplink and the downlink. Thus, the UE 110 may communicate with the SCell 120B in the unlicensed spectrum in both the uplink and downlink.

The SCell 120B may be, for example, an eNB modified to operate in the unlicensed spectrum, a small cell, a femtocell, a picocell, a microcell etc. Thus, the SCell 120B may be any type of base station that may communicate with the UE 110 in the unlicensed spectrum. Utilizing LAA, the SCell 120B may communicate over the 5 GHz band (e.g. Band 46) in the unlicensed spectrum. A single base station may include the PCell 120A and the SCell 120B, e.g., a single base station may have a first connection to the UE 110 and provide a first portion of the total bandwidth to the UE 110 in the licensed band and the same base station may have a second connection to the UE 110 and provide the second portion of the total bandwidth to the UE 110 in the unlicensed spectrum.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 also includes stations (STA) 112, 114 and 116. Those skilled in the art will understand that STAs 112-116 may be any type of electronic component that is configured to connect to a network via WiFi (or any other wireless protocol), e.g., mobile phones, tablet computers, desktop computers, smartphones, phablets, embedded devices, wearables, Internet of Things (IoT) devices, etc. It should also be understood that an actual network arrangement may include any number of STAs being used by any number of users. Further, the UT 110 and STAs 112-116 may correspond to the same user or each may correspond to a different user. Thus, the example of STAs 112-116 is merely provided for illustrative purposes and the exemplary embodiments may apply to any number of STAs.

The UE 110 may operate a hotspot service by enabling the STAs 112-116 to utilize the WiFi chip of the UE 110 as an access point. For example, STAs 112-116 may connect to the WiFi chip of the UE 110 via a 5 GHz band or a 2.4 GHz band. The UE 110 may provide the STAs 112-116 with a connection to the Internet 130 via the UE 110 connection to the LTE-RAN 120. As mentioned above, the UE 110 may utilize LAA in both the uplink and the downlink. Thus, the LTE-RAN 120, via the PCell 120A and the SCell 120B, may provide the UE 110 with LAA functionality and the UE 110 may utilize the total bandwidth offered by the PCell 120A and the SCell 120B to provide the STAs 112-116 with a connection to the Internet 130.

Figure 2:
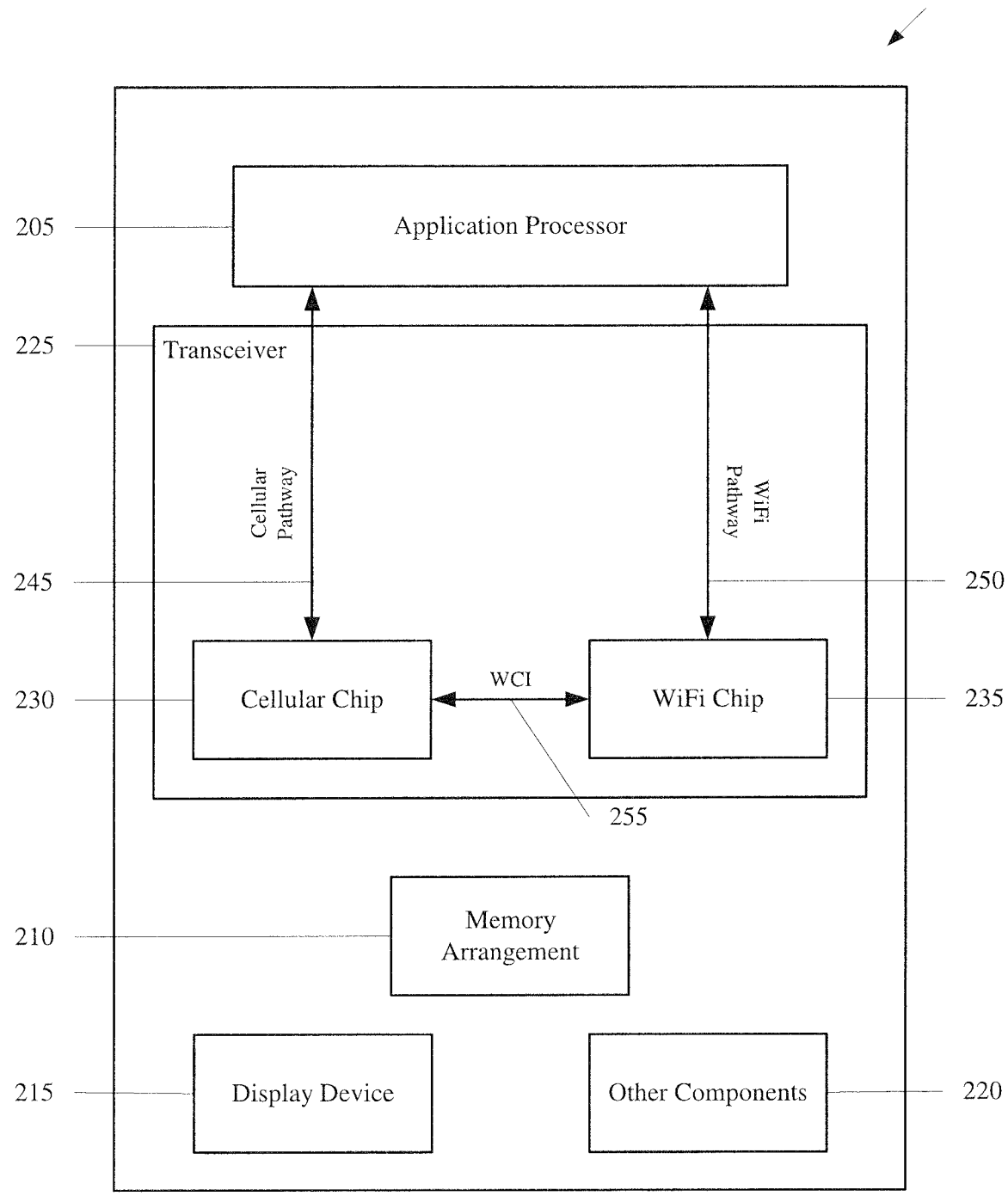
FIG. 2 shows an exemplary user equipment (UE) according to various exemplary embodiments described herein.

FIG. 2 shows an exemplary UE 110 that is configured to avoid interference when operating a hotspot service and utilizing CA in the unlicensed spectrum to exchange data with the LTE-RAN 120 according to various exemplary embodiments described herein. The UE 110 may be any type of electronic component that is configured to communicate via a network, e.g., mobile phones, tablet computers, desktop computers, smartphones, phablets, embedded devices, wearables, Internet of Things (IoT) devices, etc. The UE 110 may be configured to communicate wirelessly using a variety of different frequencies. For example, the UE 110 may include components corresponding to the various frequencies and wireless communications networks in which the wireless communication is to be performed. Accordingly, the UE 110 is configured to enable coexistence between multiple wireless technologies within a single device. The UE 110 may include an application processor 205, a memory arrangement 210, a display device 215, other components 220, and a transceiver 225.

The application processor 205 may be configured to execute a plurality of applications of the UE 110. For example, the applications executed by the application processor 205 may include a web browser when connected to a communication network (e.g. LTE-RAN 120) via the transceiver 225. The applications may also include an interference avoidance application that detects conflicts between the cellular chip 230 and the WiFi chip 235 corresponding to the frequencies and radio frequency (RF) components that may be utilized by the cellular chip 230 and the WiFi chip 235. When a conflict is detected, the interference avoidance application may generate and send a request to either the cellular chip 230 or the WiFi chip 235 to utilize a different frequency, utilize a particular frequency at a different time, utilize different RF components, utilize the RF components at a different time, or a combination thereof.

The above described applications being an application (e.g., a program) executed by the application processor 205 is only exemplary. The applications may also be represented as components of one or more multifunctional programs, a separate incorporated component of the UE 110 or may be a modular component coupled to the UE 110, e.g., an integrated circuit with or without firmware. In addition, in some UEs, certain functionality described with regard to the application processor 205 is performed by a baseband processor or a single processor that performs the functionality of the application processor 205 and a baseband processor. The exemplary embodiments may be implemented in any of these or other configurations of a UE.

The memory 210 may be a hardware component configured to store data related to operations performed by the UE 110. Specifically, the memory arrangement 210 may store wireless operation data (e.g., frequencies in which the chips operate). The display device 215 may be a hardware component configured to show data to a user. The other components 220 may include at least one antenna, a power supply, an input/output device, etc.

The transceiver 225 may be a hardware component configured to transmit and/or receive data. The transceiver 225 may enable communication with other electronic devices directly or indirectly through a network based upon an operating frequency of the network. The transceiver 225 may operate on a variety of different frequencies that are related to a cellular network, a WiFi network and any other network with which the UE 110 is configured to communicate. Accordingly, in this example, the transceiver 225 may include a cellular chip 230 for the wireless functionalities related to the cellular network. The transceiver 225 may further include a WiFi chip 235 for the wireless functionalities related to the WiFi network. Thus, the WiFi chip 235 may operate in the Industrial, Scientific, and Medical (ISM) band. The exemplary embodiments will be described with regard to the WiFi chip 235 operating in the 2.4 GHz ISM band and in the 5 GHz ISM band. However, reference to the 2.4 GHz band and the 5 GHz band is merely for illustrative purposes and the WiFi chip 235 may utilize any portion of the ISM band.

The WiFi chip 235 may also operate as an access point for a further device to communicate with a network. For example, the WiFi chip 235 may provide a hotspot service which enables a further device to connect to the WiFi chip 235 in the 2.4 GHz or the 5 GHz band. The UE 110 may utilize the cellular chip 230 to enable communication between the further device connected to the WiFi chip 235 and the network. It should be noted that any number of further devices may be utilize the WiFi chip 235 as an access point.

The components of the UE 110 may be embodied in an integrated circuit (IC) board. For example, the cellular chip 230 may be embodied as a first IC, the WiFi chip 235 may be embodied as a second IC and the application processor 205 may be embodied as a third IC. Alternatively, the cellular chip 230 and the WiFi chip 235 may be embodied as a first IC and the application processor may be embodied as a second IC. In another example, the cellular chip 230 may be embodied as a first IC and the WiFi chip 235 and the application processor 205 may be embodied as a second IC. In another example, the WiFi chip 235 may be embodied as a first IC and the cellular chip 230 and the application processor 205 may be embodied as a second IC. In another example, the cellular chip 230, the WiFi chip 235 and the application processor 205 may all be embodied as a first IC. The above examples are merely for illustrative purposes and the exemplary embodiments may relate to the cellular chip 230, the WiFi chip 235, and the application processor 205 being embodied as an IC in any arrangement.

Regardless of their arrangement, pathways may exist between the cellular chip 230, the WiFi chip 235, and the application processor 205. For example, a cellular pathway 245 may connect the cellular chip 230 to the application processor 205 while a WiFi pathway 250 may connect the WiFi chip 235 to the application processor 205. In another example, a WCI pathway 255 may connect the cellular chip 230 to the WiFi chip 235. Those skilled in the art will understand that when the cellular chip 230, the WiFi chip 235, and the application processor 205 are embodied as ICs may determine the manner in which the pathways 245, 250, 255 may be provided for the interconnections between the WiFi chip 235 and the cellular chip 230, between the cellular chip 230 and the application processor 205 and between the WiFi chip 235 and the application processor 205. The pathways 245, 250 and 255 may provide a connection internal to the ICs on which the various chips are disposed, a connection external to the cellular chip 230, the WiFi chip 235, and the application processor 205 or any combination thereof. Thus, the pathways 245, 250, 255 provide an exemplary respective manner for data to be exchanged between the components of the transceiver 225.

The cellular chip 230 and the WiFi chip 235 being shown as part of the transceiver 225 is only exemplary. Accordingly, the cellular chip 230 and the WiFi chip 235 may be individual components. Therefore, the exemplary embodiments may relate to any configuration of the transceiver 225, cellular chip 230 and WiFi chip 235.

As discussed above, the transceiver 225 may operate on a variety of different frequencies. The cellular chip 230 may provide functionalities related to the cellular network. With LAA, the cellular chip 230 may utilize the 5 GHz band in the unlicensed spectrum for communication with the network. The WiFi chip 235 may provide functionalities related to a WiFi network and hotspot service. With hotspot service, the UE 110 and a further device connect over the 2.4 GHz or the 5 GHz band. Thus, when providing hotspot service and executing LAA, the UE 110 may experience interference and degradation of performance due to the utilization of the same frequency and the same RF components.

The exemplary embodiments provide a first mechanism for avoiding interference hotspot service and CA in the unlicensed spectrum. The first mechanism utilizes the Wireless Coexistence Interface (WCI) pathway 255. The WCI pathway 255 is designed for the transmission of messages between the cellular chip 230 and the WiFi chip 235. The messages may be a WCI-2 message and may relate to information corresponding to frequencies and components utilized during the execution of LAA and hotspot service. For example, the cellular chip 230 may generate a WCI-2 message to indicate to the WiFi chip 235 that the cellular chip 230 is transmitting and receiving in the 5 GHz band. The WiFi chip 235 may then avoid use of the 5 GHz band for hotspot service. It should be noted that the indication may be any format suitable for transmission over the WCI and any reference to WCI or WCI-2 is merely for exemplary purposes. Those skilled in the art will understand that WCI is one example of an interface that can be used to facilitate communication between the cellular chip 230 and the WiFi chip 235. Therefore, the exemplary embodiments may apply to any type of interface that may exchange information between the cellular chip 230 and the WiFi chip 235.

The exemplary embodiments also provide a second mechanism for avoiding interference between hotspot service and CA in the unlicensed spectrum. The second mechanism uses the application processor 205. For instance, the application processor 205 may detect a conflict between the LAA and hotspot service utilization of a particular frequency or a particular RF component. Accordingly, the application processor 205 may generate a request to be transmitted to either the cellular chip 230 or the WiFi chip 235 to utilize a different frequency, utilize a particular frequency at a different time, utilize different RF components, utilize the RF components at a different time, or a combination thereof. For example, the application processor 205 may generate a request and transmit the request to the cellular chip 230 over the cellular pathway 245. Alternatively, the application processor 205 may generate a request and transmit the request to the WiFi chip 235 over the WiFi pathway 250. Examples of each of these mechanisms will be described in greater detail below.

Figure 3:
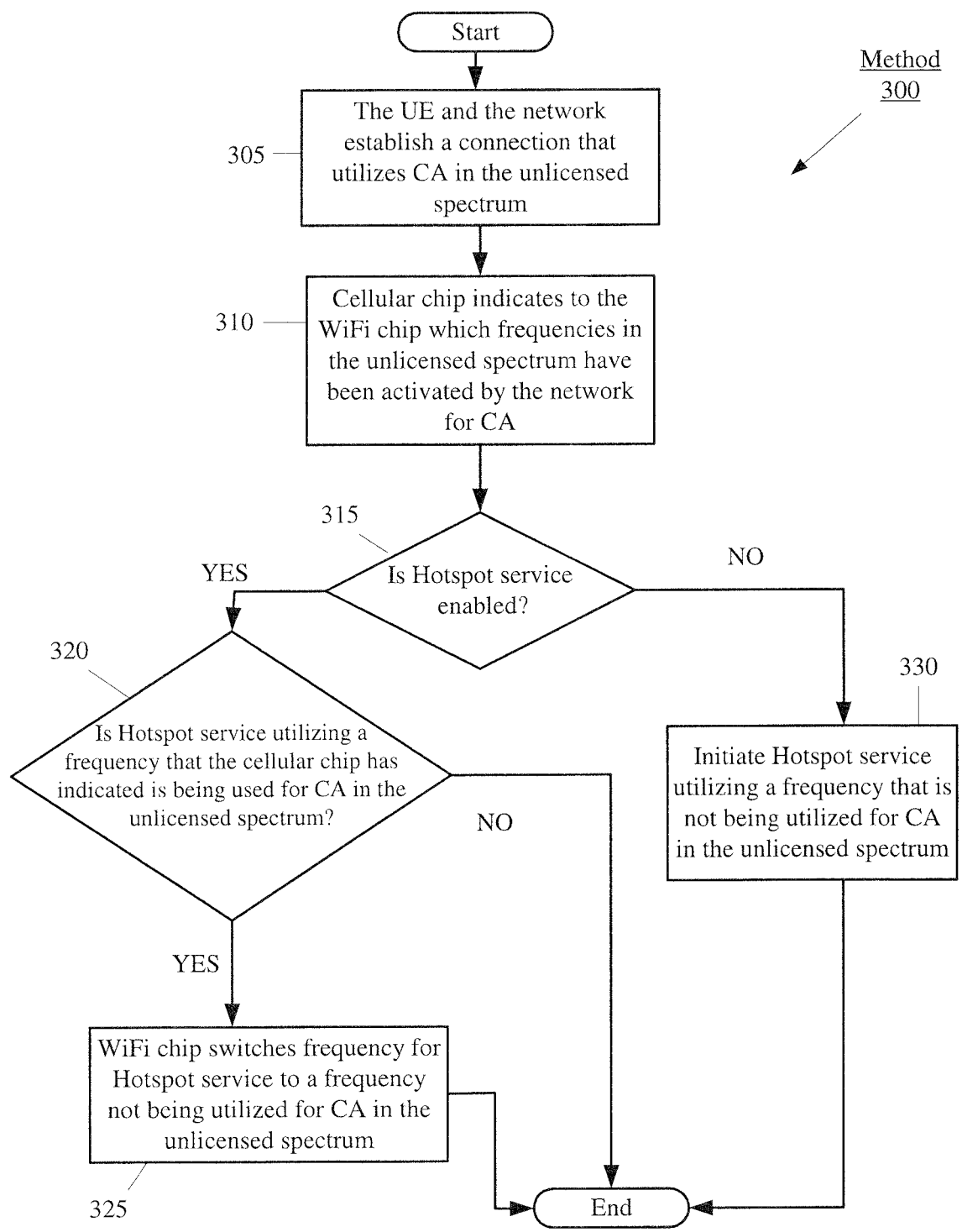
FIG. 3 shows a method for avoiding interference between hotspot service and carrier aggregation (CA) in the unlicensed spectrum according to various exemplary embodiments herein.

FIG. 3 shows a method 300 for avoiding interference between hotspot service and CA in the unlicensed spectrum according to the exemplary embodiments. The method 300 may relate to the first mechanism of the exemplary embodiments in which the cellular chip 230 and the WiFi chip 235 utilize the WCI 255 to exchange information. Thus, the method 300 is performed by the UE 110 and the method 300 will be described with regard to the network arrangement 100 of FIG. 1.

In 305, the LTE-RAN 120 may enable CA in the unlicensed spectrum. For example, the UE 110 may be connected to the LTE-RAN 120 via the PCell 120A. The PCell 120A may determine that the UE 110 should be provided additional bandwidth based on throughput requirements. To provide the UE 110 with additional bandwidth the PCell 120A may coordinate with the SCell 120B and enable LAA. Thus, the PCell 120A may provide the UE 110 with a first portion of the total bandwidth via the licensed spectrum and the SCell 120B may provide the UE 110 with a second portion of the total bandwidth via, for example, the 5 GHz band in the unlicensed spectrum.

In 310, the cellular chip 230 generates a message indicating which frequencies in the unlicensed spectrum have been activated by the network for communication with the UE 110. Subsequently, the cellular chip 230 transmits the message over the WCI 255. Thus, the cellular chip 230 generates and transmits a message indicating that the UE 110 is utilizing the 5 GHz band for LAA. As mentioned above, the use of WCI 255 is merely exemplary and the exemplary embodiments may utilize any interface for executing communication between the cellular chip 230 and the WiFi chip 235. Accordingly, the message may be any type of message (e.g. WCI message, WCI-2 message) or any type of indication from the cellular chip 230 to the WiFi chip 235 that correspond to which bands in the unlicensed spectrum have been activated by the LTE-RAN 120.

In 315, the WiFi chip 235 determines whether hotspot services are enabled. For example, the WiFi chip 235 determines whether further devices (e.g. STAs 112-116) are utilizing the WiFi chip 235 as an access point. If the WiFi chip 235 determines that hotspot operation is enabled then the method 300 continues to 320. If the WiFi chip 235 determines that the hotspot operation is not enabled then the method 300 continues to 330.

In 320, the WiFi chip 235 may determine if the hotspot service is utilizing a frequency band that the cellular chip 230 has indicated is being used for CA in the unlicensed spectrum. As mentioned above, STAs 112-116 may connect to the WiFi chip 235 and exchange information in the 5 GHz band or in the 2.4 GHz band. The UE 110 may experience interference during execution of LAA and hotspot service when LAA utilizes the 5 GHz band and the hotspot service also utilizes the 5 GHz band. If the WiFi chip 235 determines that none of the STAs 112-116 are utilizing the 5 GHz band then the method 300 ends because there is no interference. If the WiFi chip 235 determines that at least one of the STAs 112-116 are utilizing the 5 GHz band the method 300 continues to 325.

In 325, the WiFi chip 235 switches the frequency for hotspot service between the WiFi chip 235 and the at least one STAs 112-116 from the 5 GHz band to the 2.4 GHz band. Again, reference to the 5 GHs and 2.4 GHz is merely exemplary and the WiFi chip 235 may switch the frequency for hotspot service from any band that may be used in CA in the unlicensed spectrum to any band that is not utilized for current CA in the unlicensed spectrum operations. Thus, the WiFi chip 235 enables the UE 110 to avoid interference during operation of LAA and hotspot service by switching the frequency for hotspot service from a frequency that may be utilized by CA in the unlicensed spectrum to a frequency that is not being utilized by CA in the unlicensed spectrum. This change in frequency may include a switch from a first band within the 5 GHz hand to a second band within the 5 GHz band, e.g., the UE 110 may switch WiFi communications from channel 100 to channel 112. However, the frequency switch may also include switching completely away from the band being used by the cellular chip.

In 330, after determining that hotspot operation is not enabled in 315, the WiFi chip 235 may be triggered to initiate hotspot service. During initiation, the WiFi chip 235 determines which frequencies in the unlicensed spectrum are being utilized based on the message received form the cellular chip 230 in 310. Accordingly, the WiFi chip 235 may enable hotspot service in the 2.4 GHz band. The WiFi chip 235 utilizes the 2.4 GHz band to avoid interference with LAA functionality that is utilizing the 5 GHz band. Once again, that the 2.4 GHz band is merely exemplary and the WiFi chip 235 may initiate hotspot service in any band that is not utilized for CA in the unlicensed spectrum.

Figure 4:
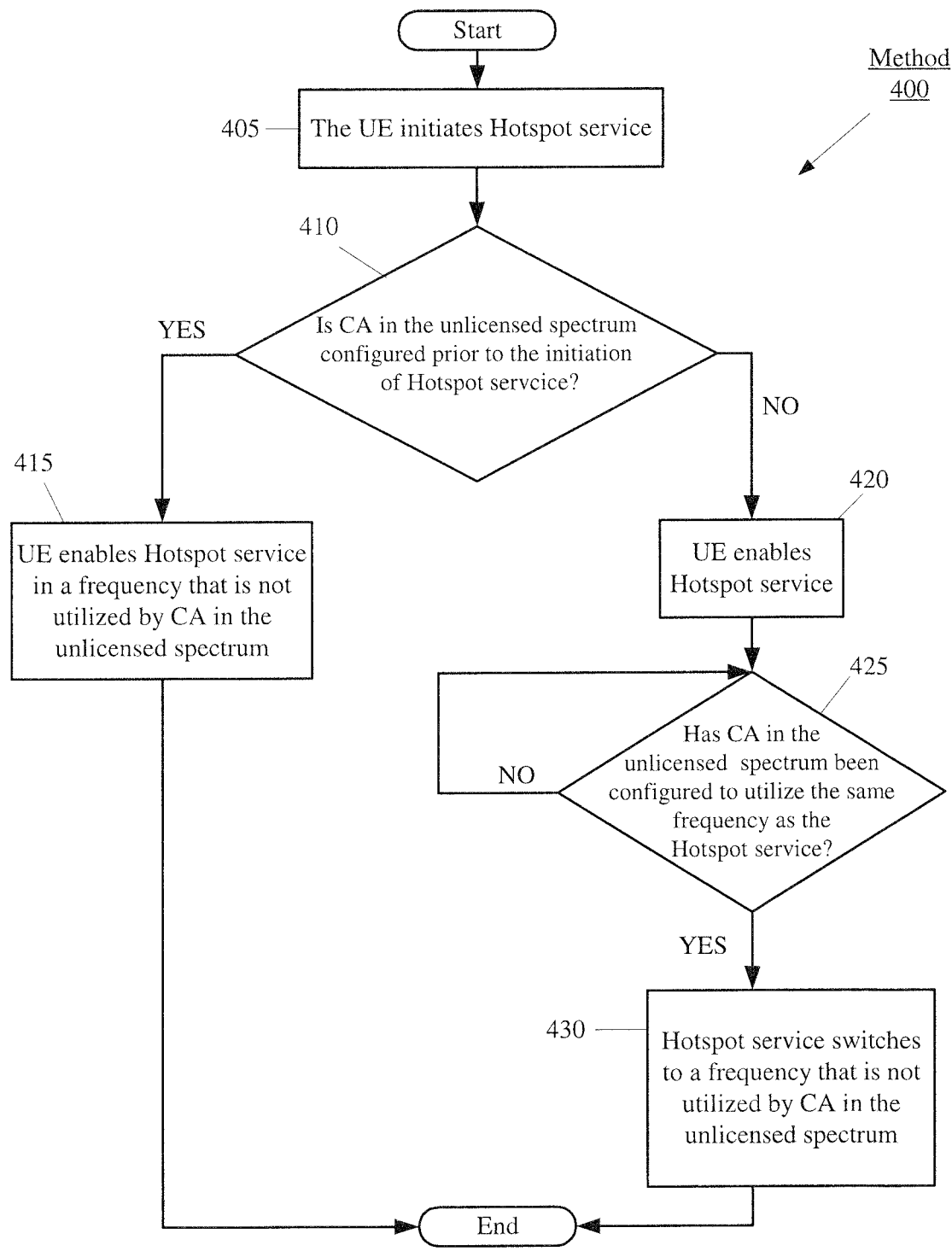
FIG. 4 shows a method for avoiding interference between hotspot service and carrier aggregation (CA) in the unlicensed spectrum according to various exemplary embodiments herein.

FIG. 4 shows a method 400 for avoiding interference between hotspot service and CA in the unlicensed spectrum according to the exemplary embodiments. The method 400 may relate to the second mechanism of the exemplary embodiments in which the application processor 205 detects conflicts between hotspot service and CA in the unlicensed spectrum. Accordingly, the application processor 205 requests that either the cellular chip 230 or the WiFi chip 235 utilize a different frequency band. Thus, the method 400 may be performed by the UE 110 and the method 400 will be described with regard to the network arrangement 100 of FIG. 1.

In 405, the UE 110 initiates hotspot service and provides a connection between STAs 112-116 and the Internet 130 by allowing the STAs 112-116 to utilize the WiFi chip 235 as an access point. The hotspot service may be initiated by user instruction, a request from one of the STAs 112-116 or in any other manner. The connection between the WiFi chip 235 and the STAs 112-116 may exist in the 5 GHz band or the 2.4 GHz band. The 5 GHz band may also be utilized by the UE 110 for CA in the unlicensed spectrum. Reference to the 5 GHz band is merely exemplary and the exemplary embodiments may apply to any band that may be utilized by hotspot service and CA in the unlicensed spectrum.

In 410, the application processor 205 may determine whether the LTE-RAN 120 has configured a connection with the UE 110 that includes CA in the unlicensed spectrum prior to establishing the hotspot service initiated in 405. For example, the UE 110 may have established a connection with the LTE-RAN 120 via the PCell 120A. Subsequently, the PCell 120A or the UE 110 may determine that the UE 110 may require more bandwidth, in either the uplink or the downlink, than the amount of bandwidth available from the PCell 120A. Accordingly, the LTE-RAN 120 may activate LAA or any type of CA that utilizes the unlicensed spectrum. With LAA, the PCell 120A provides the UE 110 with a first portion of the total bandwidth and the SCell 120B provides the UE 110 with the second portion of the total bandwidth. If the application processor 205 determines that the LTE-RAN 120 and the UE 110 have configured a connection that includes CA in the unlicensed spectrum prior to the initiation of the hotspot service in 405, the method continues to 415. If the application processor 205 determines that LTE-RAN 120 and the UE 110 have not configured a connection that includes CA in the unlicensed spectrum prior to the initiation of the hotspot service in 405 the method continues to 420.

Thus, the application processor 205 may check for conflicts between the hotspot service and CA in the unlicensed spectrum when the UE 110 has enabled hotspot service utilizing a frequency band that may be utilized by CA in the unlicensed spectrum. The application processor 205 may base this determination on a variety of factors. For example, the application processor 205 may execute a specific application that checks for conflicts, may determine a conflict exists based on the execution of other applications, may receive information related to frequencies or RF components utilized for CA in the unlicensed spectrum from the cellular chip 230 over the cellular pathway 245 or may receive information related hotspot service from the WiFi chip 235 over the WiFi pathway 250. The application processor 205 may base the determination on an individual factor, a combination of factors or in any other manner in which an application processor 205 may determine which frequencies or RF components may be utilized by either hotspot service or CA in the unlicensed spectrum.

In 415, the application processor 205 has determined that the UE 110 has established a connection with the LTE-RAN 120 that utilizes CA in the unlicensed spectrum prior to the initiation of the hotspot service in 405. Based on this determination the application processor 205 requests that the WiFi chip 235 only provides hotspot service in a frequency band that is not being utilized by CA in the unlicensed spectrum. Subsequently, the WiFi chip 235 provides the hotspot service initiated in 405 utilizing a frequency band that is not being utilized by CA in the unlicensed spectrum (e.g. 2.4 GHz).

For example, if the application processor 205 determines that the UE 110 is utilizing LAA or any other CA in the unlicensed spectrum, the application processor 205 may transmit a message over the WiFi pathway 250 to the WiFi chip 235 requesting that the WiFi chip 235 enable STAs 112-116 to connect to the hotspot service in the 2.4 GHz band. Accordingly, the UE 110 avoids a scenario where hotspot service and CA in the unlicensed spectrum may attempt to utilize the same frequency band and the same RF components and thus, the UE 110 is able to avoid a scenario where interference between hotspot service and CA in the unlicensed spectrum may occur.

In 420, the application processor 205 has determined that the UE 110 has not established a connection with the LTE-RAN 120 that utilizes CA in the unlicensed spectrum prior to the initiation of the hotspot service in 405. Accordingly, the UE 110 may enable the hotspot service initiated in 405 and utilize the 5 GHz band for the connection between the WiFi chip 235 of the UE 110 and the STAs 112-116. However, since the hotspot service is utilizing a band that may be later utilized by CA in the unlicensed spectrum, the UE 110 may experience interference if CA in the unlicensed spectrum is configured during hotspot service.

In 425, the application processor determines that CA in the unlicensed spectrum is configured and is utilizing the same frequency that the hotspot service is utilizing. For example, when hotspot service is enabled and utilizing a frequency band that may be utilized for CA in the unlicensed spectrum (e.g. 5 GHz) the application processor continuously checks for a conflict between the hotspot service and CA in the unlicensed spectrum. Thus, at a first time after hotspot service is enabled and utilizing a frequency that may be utilized for CA in the unlicensed spectrum the application processor 205 may determine whether CA in the unlicensed spectrum has been configured to utilize a frequency that the hotspot service is may be utilizing. If the application processor 205 determines that there is no conflict, the application processor repeats 425 at a second time, a third time, etc. until the application processor 205 either determines that hotspot service is no longer active or that there is a conflict between the hotspot service and CA in the unlicensed spectrum. When the application processor 205 determines that there is a conflict the method continues to 430.

In 430, to avoid interference between hotspot service and CA in the unlicensed spectrum the application processor 205 may request that the WiFi chip 235 of the UE 110 may switch the connection between the WiFi chip 235 and STAs 112-116 to a connection that utilizes the 2.4 GHz band if CA in the unlicensed spectrum is configured during hotspot service. Based on the request, the WiFi chip 235 modifies the hotspot service by switching the hotspot service from a frequency that may be utilized by CA in the unlicensed spectrum to a frequency that is not utilized by CA in the unlicensed spectrum.

For example, the UE 110 may provide hotspot service in the 5 GHz band for STAs 112-116. Subsequently, the UE 110 and the LTE-RAN 120 may configure a connection that includes CA in the unlicensed spectrum. Prior to establishing the connection that includes CA in the unlicensed spectrum, the application processor 205 generates and transmits a request to the WiFi chip 235 over the WiFi pathway 250 to proactively switch from providing hotspot service in the 5 GHz band to providing hotspot service in the 2.4 GHz band. Based on the request, the WiFi chip 235 provides hotspot service in the 2.4 GHz band and enables the UE 110 avoid interference between hotspot service and CA in the unlicensed spectrum. It should be noted that the application processor 205 may generate and transmit the request in a single message, in a plurality of messages or in any other manner that allows the WiFi chip 235 to determine to switch to a band that CA in the unlicensed spectrum is not utilizing. It should also be noted that reference to 5 GHz and 2.4 GHz is merely exemplary and the exemplary embodiments may switch from any band that CA in the unlicensed spectrum may utilize to a band that CA in the unlicensed spectrum is not utilizing.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method comprising:
    at a user equipment (UE) having a cellular connection established by a cellular chip, the cellular connection including a secondary component carrier (SCC) of carrier aggregation (CA) in an unlicensed spectrum:
    receiving, by a WiFi chip of the UE, a message from the cellular chip indicating a first frequency band corresponding to the SCC;
    determining, by one of the WiFi chip or an applications processor, whether a hotspot service is enabled by the WiFi chip and is utilizing at least a portion of the first frequency band that the cellular chip has indicated corresponds to the SCC; and
    when the hotspot service is enabled, switching, by the WiFi chip, the hotspot service from the first frequency band to a second frequency band in the unlicensed spectrum that is not in use for the hotspot service, wherein the first frequency band and the second frequency band do not include overlapping frequencies.

2. The method of claim 1, further comprising:
    when hotspot service is not enabled, determining, by one of the WiFi chip or the applications processor, whether hotspot service is to be enabled;
    when the hotspot service is to be enabled, selecting by the WiFi chip or the applications processor, the second frequency band on which hotspot service may occur; and enabling, by the WiFi chip, the hotspot service on the second frequency band.

3. The method of claim 1, wherein the message is received via a wireless coexistence interface (WCI) connection between the cellular chip and the WiFi chip.

4. The method of claim 3, wherein the message comprises a WCI-2 message.

5. The method of claim 1, wherein the first frequency band is a 5 GHz Industrial, Scientific, and Medical (ISM) band and the second frequency band is a 2.5 GHz ISM band.

6. The method of claim 1, wherein the first frequency band is a first portion of a 5 GHz Industrial, Scientific, and Medical (ISM) band and the second frequency band is a second portion of the 5 GHz ISM band.

7. The method of claim 1, wherein the hotspot service comprises the UE acting as an access point to allow a further device to connect to a network via the cellular connection.

8. A user equipment (UE), comprising:
a cellular chip configured to establish a cellular connection including a secondary component carrier (SCC) of carrier aggregation (CA) in the unlicensed spectrum, the cellular chip further configured to transmit a message indicating a first frequency band corresponding to the SCC; and
a WiFi chip configured to receive the message and further configured to provide a hotspot service to a user equipment (UE), wherein, when the hotspot service is enabled utilizing at least a portion of the first frequency band that the cellular chip has indicated corresponds to the SCC, the WiFi chip switches the hotspot service from the first frequency band to a second frequency band in the unlicensed spectrum that is not in use for the hotspot service, wherein the first frequency band and the second frequency band do not include overlapping frequencies.

9. The UE of claim 8, wherein, when hotspot service is not enabled when the message is received, the WiFi chip is further configured to determine whether hotspot service is to be enabled and when the hotspot service is to be enabled for the UE, the WiFi chip is triggered to initiate the hotspot service by selecting the second frequency band and enabling the hotspot service on the second frequency band.

10. The UE of claim 8, further comprising:
a wireless coexistence interference (WCI) connection between the cellular chip and the WiFi chip, wherein the message is transmitted via the WCI connection.

11. The UE of claim 8, wherein the first frequency band is a 5 GHz Industrial, Scientific, and Medical (ISM) band and the second frequency band is a 2.5 GHz ISM band.

12. The UE of claim 8, further comprising:
an applications processor configured to determine whether the cellular connection is utilizing the first frequency band corresponding to the SCC and to determine whether the hotspot service is to be initiated by the UE, the applications processor further configured to send a further message to the WiFi chip to enable the hotspot service using the second frequency band.

13. The UE of claim 12, further comprising:
a WiFi pathway between the applications processor and the WiFi chip, wherein the further message is transmitted via the WiFi pathway.

14. The UE of claim 12, wherein at least two of the cellular chip, the WiFi chip and the applications processor are included in a single integrated circuit.

15. A method comprising:
determining that a hotspot service is to be initiated;
determining whether a cellular connection is utilizing a first frequency band as at least one secondary component carrier (SCC) in an unlicensed spectrum; and
enabling, when the cellular connection is utilizing the SCC in the unlicensed spectrum, the hotspot service on a second frequency band that is different from the first frequency band in the unlicensed spectrum.

16. The method of claim 15, further comprising:
when the cellular connection is not utilizing the SCC in the unlicensed spectrum, enabling hotspot service on the first frequency band.

17. The method of claim 16, further comprising:
determining whether the cellular connection is utilizing the SCC in the unlicensed spectrum at a time subsequent to enabling the hotspot service on the first frequency band;
when the cellular connection is utilizing the SCC in the unlicensed spectrum at the time subsequent to enabling the hotspot service on the first frequency band, switching the hotspot service from the first frequency band to the second frequency band.

18. The method of claim 15, wherein an application processor of a UE performs the determining that the hotspot service is to be initiated and determining whether the cellular connection is utilizing the first frequency band.

19. The method of claim 15, wherein the first frequency band is a 5 GHz Industrial, Scientific, and Medical (ISM) band and the second frequency band is a 2.5 GHz ISM band.

20. The method of claim 15, wherein the hotspot service comprises the UE acting as an access point to allow a further device to connect to a network via the cellular connection.

* * * * *